US United States Patent [15] 3,647,496
Bagai et al. [45] Mar. 7, 1972

[54] PIGMENT COMPOSITIONS

[72] Inventors: Satish Kumar Bagai; Arthur Topham, both of Manchester, England

[73] Assignee: Imperial Chemical Industries Limited, London, England

[22] Filed: Apr. 6, 1970

[21] Appl. No.: 26,167

[30] Foreign Application Priority Data

Apr. 9, 1969 Great Britain.....................18,215/69

[52] U.S. Cl. ..........................................106/309, 106/288 Q
[51] Int. Cl. .......................................................C08h 17/14
[58] Field of Search ......................................106/309, 288 Q

[56] References Cited

UNITED STATES PATENTS 3,288,621 11/1966 Barron et al............................106/288

Primary Examiner—James E. Poer
Assistant Examiner—J. V. Howard
Attorney—Cushman, Darby & Cushman

[57] ABSTRACT

Phthalocyanines, halogenomethylphthalocyanines and aliphatic primary or secondary amines are milled together in presence of solid grinding acids which are soluble in, and subsequently removed by, aqueous media. Reaction of the amines and halogenomethylphthalocyanines takes place and pigment compositions are obtained which are readily dispersible in organic solvents and which are of value in inks and paints.

10 Claims, No Drawings

PIGMENT COMPOSITIONS

This invention relates to a new process for the manufacture of pigment compositions.

According to the invention there is provided a process for the manufacture of pigment compositions which comprises grinding a mixture of a phthalocyanine, a halogenomethylphthalocyanine, a primary or secondary aliphatic amine, and a solid grinding aid capable of dissolution by a neutral, alkaline or acid aqueous medium, and washing the ground mixture with the aqueous medium to remove the grinding aid in an aqueous solution.

As phthalocyanines which may be used in the process of the invention there may be mentioned water-insoluble phthalocyanines free from sulphonic acid groups for example copper phthalocyanine, copper halogenophthalocyanines such as copper monochlorophthalocyanine, copper phthalocyanines containing other substituent groups such as phenyl or methyl groups and the corresponding metal free phthalocyanines and phthalocyanines containing other metals such as zinc or nickel and mixtures of such phthalocyanines. The phthalocyanine may be used in crude form, for example as obtained by heating phthalic anhydride, urea, copper chloride and sodium molybdate in a high-boiling solvent.

As halogenomethylphthalocyanines there are mentioned bromomethyl and especially chloromethylphthalocyanines in which a phthalocyanine as mentioned above is substituted by from one to eight chloromethyl groups, and particularly from two to four chloromethyl groups. Such halogenomethylphthalocyanines are usually obtained in the form of mixtures of halogenomethylphthalocyanines substituted to different extents by the halogenomethyl groups, and these mixtures are suitable for use in the process of this invention.

As aliphatic amines there may be mentioned primary amines such as octadecylamine and preferably secondary amines such as Armeen 2S (a commercially available unsaturated fatty secondary amine of average molecular weight 530) (Armeen is a registered Trademark). The preferred amines are those containing at least eight carbon atoms.

As grinding aids there may be mentioned especially inorganic salts such as anhydrous sodium carbonate, sodium chloride, anhydrous sodium sulphate and anhydrous calcium chloride, which are soluble in water and compounds such as magnesium carbonate, dolomite and chalk which may be removed by washing with dilute acid and alumina which may be removed by washing with dilute alkali or dilute acid.

The halogenomethylphthalocyanine is preferably used in amount between 5 and 50 percent and especially between 10 and 30 percent of the weight of phthalocyanine.

The aliphatic amine is preferably used in amounts between 50 and 150 percent of that needed to react with all the halogenomethyl groups of the halogenomethylphthalocyanine.

The grinding aid is preferably used in amounts between 200 and 1,200 percent, and especially between 400 and 800 percent, of the weight of the phthalocyanine and halogenomethylphthalocyanine.

The grinding step of the process of the invention may be carried out by ball-milling, pebble-milling, or attrition milling in equipment such as an edge-runner mill.

If desired other components may be added before or during the grinding step, for example inhibitors such as dimethylaniline to aid in preventing conversion of the phthalocyanine from the $\beta$ to the $\alpha$-form. The use of an inhibitor is not usually necessary if the aliphatic amine is used in amount at least that needed to react with all the halogenomethyl groups.

The grinding aid may be removed by any conventional procedure, for example by slurrying with cold water followed by filtration. It may be desirable also to slurry the product with hot dilute acid, for example sulphuric acid, to remove metal contamination arising during the grinding step, followed by filtration and washing with water to remove acid.

The product so obtained may be dried, for example in an oven at a temperature between 40° and 100° C. The dry powder may then be incorporated into gravure printing ink media using for example a high-speed mixer, or into paint by for example ball-milling with paint media. The gravure inks and paints so obtained afford prints and coatings of exceptional tinctorial strength and brightness.

EXAMPLE 1

A mixture comprising 66.7 parts of crude copper phthalocyanine, 11.2 parts of copper tris(chloromethyl)-pthalocyanine, 23.8 parts of the unsaturated fatty secondary amine marketed as Armeen 2S (Armour Hess), 15.0 parts of N,N-dimethylaniline and 600 parts of anhydrous sodium carbonate is ball-milled for 48 hours at 70° C. The sodium carbonate is removed from the mixture by slurrying in water followed by filtration and washing. The resulting pigment filter cake is reslurried with 3,000 parts of water containing 81.5 parts of sulphuric acid and stirred for four hours at 95° C. The pigment is separated, washed acid free and dried at 70° C.

The resulting product (copper phthalocyanine in $\beta$-polymorphic form) shows excellent dispersibility in gravure printing ink media (for example a solution of zinc/calcium rosinate in toluene) when incorporated with a high-speed mixer such as the Mini Torrance, and the resulting prints show exceptional tinctorial strength, brightness and greeness of shade.

The product also shows outstanding brightness and greeness of shade after ball-milling into paint media.

EXAMPLE 2

A mixture comprising 33.4 parts of crude copper phthalocyanine, 5.6 parts of copper tris(chloromethyl)phthalocyanine, 11.9 parts of Armeen 2S and 300 parts of sodium carbonate is treated as for Example 1.

The resulting pigment according to infrared analysis contains about 95 percent $\beta$-form copper phthalocyanine, and has similar technological properties to the product of Example 1.

EXAMPLE 3

A mixture comprising 33.4 parts of crude copper phthalocyanine, 5.6 parts of copper penta(chloromethyl) phthalocyanine, 11.9 parts of Armeen 2S and 300 parts of sodium carbonate is treated as for Example 1.

The product has similar technological properties to that of Example 1.

Example 4

A mixture comprising 66.7 parts of crude copper pthalocyanine, 16.8 parts of copper tris(chloromethyl)-pthalocyanine, 18.9 parts of octadecylamine, 15.0 parts of N,N-dimethylaniline and 600 parts of sodium carbonate is treated as for Example 1.

The product containing $\beta$-form copper phthalocyanine has good dispersibility in gravure ink media when incorporated with a high-speed mixer such as the Mini-Torrance.

EXAMPLE 5

A mixture comprising 33.4 parts of crude copper phthalocyanine, 5.6 parts of copper tris(chloromethyl)phthalocyanine, 6.0 parts of Armeen 2S and 300 parts of sodium carbonate is treated as for Example 1.

The product which contains 90 percent $\alpha$-form copper phthalocyanine component shows outstanding brightness of shade when milled into a paint based on an alkyd/melamine/formaldehyde resin.

EXAMPLE 6

A mixture of 82 parts of crude copper phthalocyanine, 15.5 parts of copper tris (chloromethylphthalocyanine), 2.5 parts of n-butylamine, 10 parts of dimethylaniline and 600 parts of sodium carbonate is treated as in Example 1.

The product has moderate dispersibility in gravure ink medium when incorporated with a high-speed mixer, and shows good strength and resistance to flocculation in alkyd paint medium.

We claim:

1. A process for the manufacture of pigment compositions which comprises grinding a mixture of a phthalocyanine, a halogenomethylphthalocyanine, a primary or secondary aliphatic amine, and a solid grinding aid capable of dissolution by a neutral, alkaline or acid aqueous medium, and washing the ground mixture with the aqueous medium to remove the grinding aid in an aqueous solution.

2. A process as claimed in claim 1 wherein the halogenomethylphthalocyanine is a chloromethylphthalocyanine containing from two to four chloromethyl groups.

3. A process as claimed in claim 1 herein the amine is a secondary amine.

4. A process as claimed in claim 1 wherein the amine contains at least eight carbon atoms.

5. A process as claimed in claim 1 wherein the grinding aid is water soluble.

6. A process as claimed in claim 1 wherein the grinding aid is an inorganic salt.

7. A process as claimed in claim 1 wherein the grinding aid is sodium carbonate.

8. A process as claimed in claim 1 wherein the aliphatic amine is used in amount between 50 and 150 percent of that required to react with all the halogenomethyl groups of the halogenomethylphthalocyanine.

9. A process as claimed in claim 1 wherein the aliphatic amine is used in amount at least that required to react with all the halogenomethyl groups.

10. A process as claimed in claim 1 wherein the product is extracted with hot dilute acid.

* * * * *